United States Patent [19]

Lecomte et al.

[11] Patent Number: 5,713,007
[45] Date of Patent: Jan. 27, 1998

[54] PROCESS AND DEVICE FOR DETECTING OPERATING INCONSISTENCIES IN A SYSTEM WITH MULTIPLE PHASES OF OPERATION

[75] Inventors: Pierre Lecomte, Aureville; Laurent Coquin, Toulouse, both of France

[73] Assignee: Aerospatiale Societe Nationale Industrielle, Paris, France

[21] Appl. No.: 348,873

[22] Filed: Nov. 29, 1994

[30] Foreign Application Priority Data

Dec. 14, 1993 [FR] France ................. 93 14978

[51] Int. Cl.⁶ ..................... G06F 19/00; G05B 17/00
[52] U.S. Cl. ................ 395/500; 364/424.06; 364/150; 364/151; 340/951
[58] Field of Search ................... 395/500, 11, 905, 395/906; 364/578, 424.03, 424.04, 424.06, 434, 433, 551.01, 148, 149, 150, 151; 340/948, 951, 958, 959, 960

[56] References Cited

U.S. PATENT DOCUMENTS

| 4,215,412 | 7/1980 | Berner et al. ............... 364/551.01 |
| 4,217,486 | 8/1980 | Tawfik et al. ............... 364/133 |
| 4,718,025 | 1/1988 | Minor et al. ............... 364/550 |
| 4,791,548 | 12/1988 | Yoshikawa et al. ............... 364/149 |
| 4,792,906 | 12/1988 | King et al. ............... 364/424.014 |
| 5,018,069 | 5/1991 | Pettigrew ............... 364/424.04 |
| 5,121,325 | 6/1992 | DeJonge ............... 364/442 |
| 5,208,590 | 5/1993 | Pitts ............... 340/973 |
| 5,210,704 | 5/1993 | Husseiny ............... 364/551.07 |
| 5,214,582 | 5/1993 | Gray ............... 364/424.03 |
| 5,260,874 | 11/1993 | Berner et al. ............... 364/424.03 |
| 5,274,554 | 12/1993 | Takats et al. ............... 364/424.03 |
| 5,377,112 | 12/1994 | Brown, Jr. et al. ............... 364/431.12 |
| 5,414,645 | 5/1995 | Hirano ............... 364/551.07 |

FOREIGN PATENT DOCUMENTS

| 0 375 786 | 7/1990 | European Pat. Off. . |
| 0 537 041 A1 | 4/1993 | European Pat. Off. . |
| 0 573 357 A1 | 12/1993 | European Pat. Off. . |

OTHER PUBLICATIONS

Gabor Karsai et al., "Model–Based Intelligent Process Control for Cogenerator Plants", Journal of Parallel and Distributed Computing, vol. 15, Jun. (1992), pp. 90–102.

Karsai et al., "Models and Model Building In Intelligent Process Control System", IEEE 1990, pp. 351–357.

Sztipanovits et al., "Intelligent Monitoring and Diagnostic for Plant Automation", IEEE 1990, pp. 1390–1395.

Primary Examiner—Kevin J. Teska
Assistant Examiner—Tan Nguyen
Attorney, Agent, or Firm—Fisher,Christen & Sabol

[57] ABSTRACT

A process and a device for detecting inconsistencies in the operation of a system with multiple phases of operation, controlled by at least one operator. The current phase of operation of the system is determined. For the determined phase, reference is made to at least one theoretical model representative of at least one feature of the system. The effective values of the variables used in the theoretical model is detected. The detected effective values are compared to theoretical data defined in the theoretical model. Any incompatibility detected during these comparisons is signaled together with the nature of this incompatibility. The detection system can be used with the pilotage of aircraft.

5 Claims, 1 Drawing Sheet

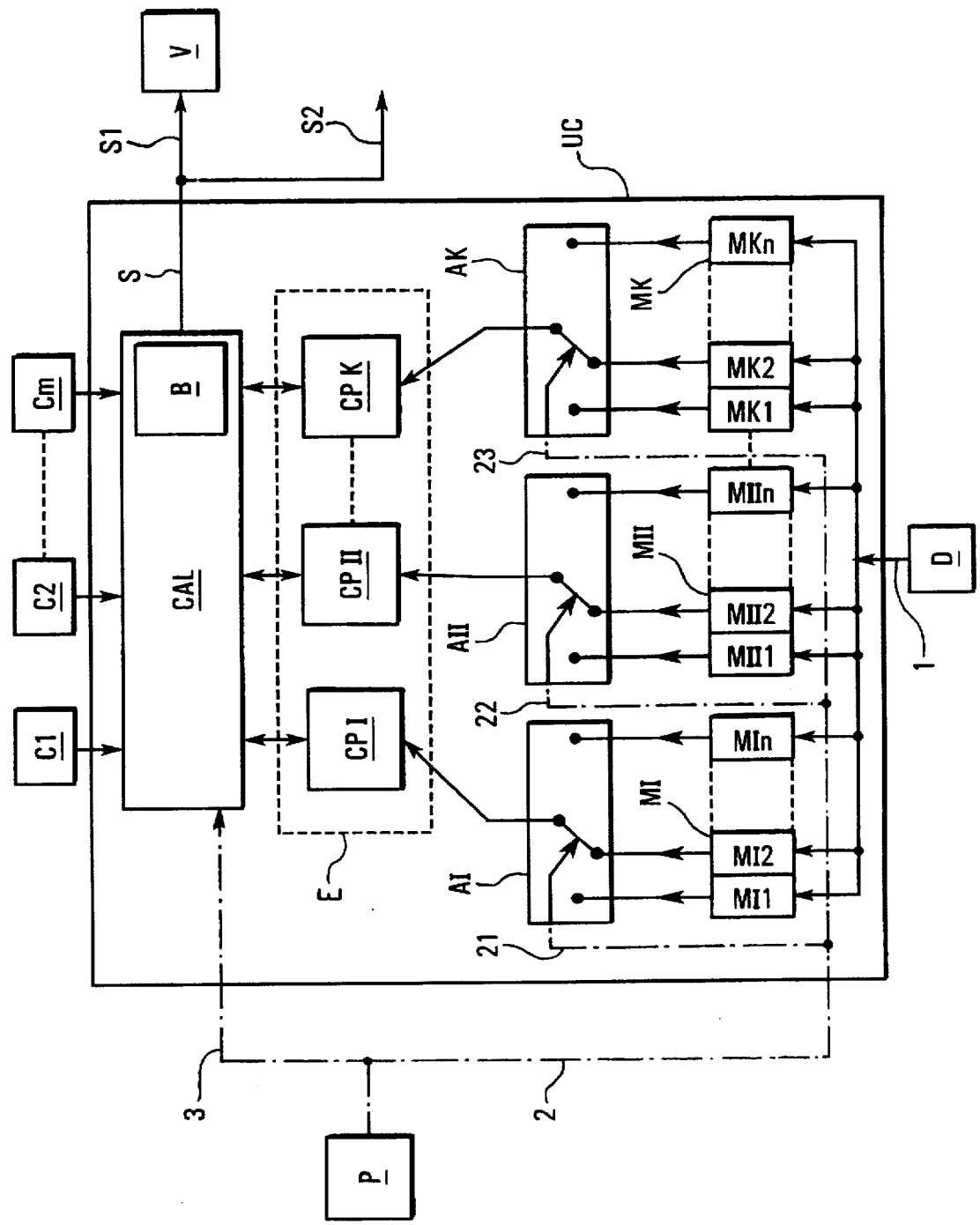

PROCESS AND DEVICE FOR DETECTING OPERATING INCONSISTENCIES IN A SYSTEM WITH MULTIPLE PHASES OF OPERATION

BACKGROUND OF THE INVENTION

The present invention relates to a process and a device for detecting operating inconsistencies in a system with multiple phases of operation involving one or more operators. A "system with multiple phases of operation" is understood, within the context of the present invention, to be any complex system, such as for example a railway, a nuclear power station, a helicopter, an airplane, etc., the operation of which is controlled by one or more operators.

Although the present invention is thus applicable to numerous systems, it will be described below more particularly in the context of an airplane, more particularly a transport airplane, the operation of which is controlled by a crew.

PRIOR ART

Analysis of accidents or incidents occurring in civil transport airplanes reveals that a large proportion of them is caused by an error, and often even several successive errors, ascribable to the flight crew. Often, this analysis reveals the presence of three general characteristics, namely an accumulation of elementary errors made by the crew, significant deviations which result from this in respect of certain characteristic parameters as compared to normal operation and a significant duration between the instant at which these errors are made and the effective appearance of a damaging incident which is the consequence thereof.

The presence of these same general characteristics has been reported during analysis of incidents occurring in many other systems.

SUMMARY OF THE INVENTION

The object of the present invention is therefore to detect anomalies occurring in the operation, implementation and running of a system and to alert the operators thereto so that they rectify these anomalies before the appearance of a damaging incident.

It will be noted that, in many systems, devices are already known which are intended to alert the operators to various anomalies, like for example the existence of a defective sensor identified by comparing several redundant sensors. However, these devices generally allow control only of certain specific cases revealed by operational experience. They do not allow continuous and, in principle, very exhaustive control of the overall state of the system, having regard both to its operation and the specific demands of its mission.

Furthermore, in the case of an airplane for example, the errors made by the crew often arise from an erroneous mental representation of the actual state of the airplane, this erroneous representation then leading the crew to take measures which are inconsistent with the actual state of the airplane or with its phase of flight, such as for example effecting running which is inconsistent with the normal running of the final approach phase or undertaking safeguarding actions which are incompatible with the type of operating anomaly encountered.

The object of the present invention is therefore more particularly to check, in a continuous manner, whether the system does indeed lie inside the domains required for the current phase of operation of said system.

For this purpose, according to the invention, the process for detecting inconsistencies in the operation of a system with multiple phases of operation, controlled by one or more operators, each of said phases corresponding to a partial domain of the operation and the set of said phases covering the whole of said operation, is notable in that:

- the current phase of operation of said system is determined;
- for said determined phase, reference is made to at least one theoretical, mathematical or logical, model representative of at least one feature of the system, namely its operation or its compatibility with the environment;
- the effective value of the variables used in said theoretical model is detected;
- said detected effective values are compared to theoretical data, namely ranges of admissible values or laws, defined in said theoretical model; and
- any incompatibility detected during these comparisons is signaled together with the nature of this incompatibility.

Thus, the continuous monitoring of the system is rendered possible, according to the invention, by considering the current phase of operation, in which the system simplifies enough for the control of a limited number of characteristic variables to be sufficient, control of such a limited number of variables being possible in practice.

Moreover, since, by virtue of the invention, it is possible to detect the characteristic variable(s) whose values do not correspond to those of normal operation, the nature of the anomaly noted can be defined clearly and thus communicated explicitly to the operators.

Furthermore, it is even conceivable, for the purpose of enhancing the process according to the invention, to specify to the operators the amendments to be made or the measures to be followed in order to correct said anomaly as quickly and efficiently as possible.

In the case of a transport airplane, the predefined models determining the mathematical laws and/or the ranges of admissible values for the characteristic variables may be of several types.

These may, in particular, be one or more models of each of the following three different types:

- models describing the operation of the airplane and of its systems;
- models describing operational procedures required or recommended and constraints relating thereto;
- models describing constraints related to the environment.

These examples are not, however, limiting and other types of models being capable of finding suitable application in the context of the present invention.

By way of example, the models of constraints related to the environment may, for example, comprise:

- a model containing the minimum altitudes to be complied with depending on the conditions and phases of flight in order to avoid any collision with the terrain; and
- two models capable of exploiting, at take-off and/or landing, information relating to the characteristics and to the state of the runway used and the atmospheric information pertinent to the relevant phase of flight.

For the implementation of the process according to the invention, there is provided, advantageously, a device which includes:

- a phase detector, determining the current phase of operation;
- a set of peripheral computers storing theoretical, mathematical and/or logical, models representative of the system, that is to say more precisely of its operation and/or of its compatibility with the environment;

a set of sensors detecting the effective values of the variables involved in these models; and a main computer furnished with a program for repetitive computation operating at a speed appropriate to the rate of change of the system and capable, depending on the current phase of operation notified by the phase detector, of searching for and picking out the inconsistencies in the operation of the system or with its environment, by feeding into the models appropriate to said current phase the values detected by said sensors and by checking the consistency with theoretical data, namely operating ranges or laws, defined in these models.

Thus, as soon as a variable characteristic of the current phase of operation departs from the limits fixed for it, said main computer is informed thereof by logging the incompatibility in the detected value of this variable with the range of admissible values or the corresponding law.

Preferably, the device according to the invention is passive and is not involved in the system's control loops. It does not, for example, exercise any automatic pilotage function. This enables said device to remain independent of elements of the system which are capable of being controlled during the implementation of the process according to the invention.

The construction of said device may be carried out along purely algorithmic lines and/or call upon artificial intelligence.

Advantageously, the device according to the invention includes groups of memories storing general characteristics of the system and characteristics of the environment which are capable of being transmitted to said peripheral computers.

Additionally, said device includes, moreover, switching means controlled by the phase detector and enabling said peripheral computers to be connected directly to the memories of said groups of memories which are associated with the current phase of operation.

Preferably, said phase detector is in accordance with that described in French Patent Application No. 93 05851 filed on May 14, 1993 and entitled "Procédé et dispositif pour détecter la phase de fonctionnement actuelle d'un système à phases de fonctionnement multiples" ["A process and device for detecting the current phase of operation of a system with multiple phases of operation"].

Advantageously, the device according to the invention includes, additionally, a display device notifying each incompatibility picked out by said main computer. Thus, it is possible, by virtue of said display device, to advise the operators explicitly of any detected anomaly and to notify them of the proposals for corrective actions.

BRIEF DESCRIPTION OF THE DRAWINGS

The single FIGURE of the drawing represents the schematic diagram of a device according to the present invention.

It allows a proper understanding of the manner in which the invention may be embodied by highlighting the logic diagram for operation of said device, noting that the switchings represented or mentioned are generally purely logical and not necessarily mechanical switchings.

DESCRIPTION OF THE PREFERRED EMBODIMENTS

The device, according to the invention and represented in the single FIGURE of the drawing, making it possible to detect the inconsistencies in the operation of a system with multiple phases of operation, in this instance n phases of operation, includes a phase detector P, a set of sensors C1, C2, . . . , Cm, a set E of peripheral computers CPI, CPII, . . . , CPK and a main computer CAL.

Said phase detector P allows automatic detection of the current phase of operation of the system, that is to say the phase of flight for an airplane, and does so even in the presence of a large number of errors on the part of the operators.

Said peripheral computers CPI, CPII, . . . , CPK store all the mathematical models adopted depending on the more or less exhaustive character searched for and to which will relate, depending on the phase, the "consistency tests", namely descriptive models of the operation of the system, which models it will be possible to simplify depending on the admissible tolerances and on the necessary limited accuracy, and also models describing the compatibility with the environment.

In the case of a transport airplane, these models will be able to comprise flight domain limitation models, flight mechanics and performance models, models of operational constraints and models of constraints related to the environment (terrain, obstacles, runways, etc.).

Said peripheral computers CPI, CPII, . . . , CPK use information, particularly technical characteristics specific to the airplane and characteristics, stored in groups MI, MII, . . . , MK of memories, of the environment of the airports relevant to the flight to be made.

Each of the various groups MI, MII, . . . , MK of memories includes n distinct memories, each of them being associated with one of the various phases of flight, that is to say that it includes information used in this phase of flight. The group MI includes, for example, the memories MI1, MI2, . . . , MIn.

The device according to the invention furthermore includes a data loader D connected via a multiple link 1 to the various memories of said groups MI, MII, . . . , MK of memories and allowing the information stored in these memories to be updated.

For the models of flight domain limitations and operational constraints, the necessary information may be extracted from the flight manual and from the operating manuals. These manuals are compiled by the constructor or by the user company, adapting the recommendations of the constructor to the internal customs and regulations of the company. Such manuals always specify, for each phase of flight, the acceptable configuration(s) for the airplane, the value of the characteristic flight parameters, or more precisely the admissible "windows" in which the varying parameters must lie. These windows take account of the measurement errors, the normal tolerances of pilotage and of a margin of action allowed to the crew.

Moreover, the models of the environmentally related constraints may, for example, contain information relating to the minimum altitude to be complied with by the airplane to avoid any collision with the terrain, as well as information relating to the atmospheric conditions and the characteristics and the state of the runway.

By way of example, the information available on airplanes relating to the altitude is as follows:

altitudes by geographical zones demarcated by parallels and meridians,

"floors" of airways, which may be lower than the zone altitude, in the vicinity of airports, minimum altitudes provided on the basis of sectors generally in polar coordinates with respect to the airport, in the intermediate-approach routes or departure trajectories, indication of minimum altitudes on each branch, on hold, definition of a protection zone and a floor, on intermediate approach or initial climb, definition of "channels" dependent on the modes of guidance used.

Similarly, general characteristics are known on landing and take-off which relate, on the one hand, to the runway, for example its state, its length and its gradient and, on the other hand, the atmospheric conditions, such as for example the temperature, the force and direction of the wind and the pressure. These characteristics, which relate to the runway and are obviously dependent on the airports served, must be available. On modern airplanes they are stored in the memories of the so-called FMGS (Flight Management and Guidance System) system or in a computerized on-board library. As regards the atmospheric information, it is currently provided by voice messages, although the wind characteristics are known on board if the airplane is equipped with an inertial navigation system. In the fairly near future an automatic Ground-Air Radio Data Transmission System (Data link) will enable data to be sent automatically from the ground.

The sensors C1, C2, . . . , Cm are usually sensors which exist on board, as for example those which detect the state of the engines, the vertical speed, the altitude, the angle of attack, etc. However, certain sensors may be stowed specially on the airplane so as to deliver particular information required for the implementation of the present invention. It will be observed that other information, for example the geographical position of the airplane, may also be provided by computers present on board the airplane, as for example aerodynamic instruments or inertial instruments.

Moreover, certain information may even be obtained from the ground, by way for example of a radio link. This may concern, in particular, the pressure, the temperature, the direction and force of the wind, the values of which are continuously available on the ground.

The device according to the invention furthermore includes switching means AI, AII, . . . , AK controlled by the phase detector P, by way of a link 2, connected to said phase detector P by one of its ends and the other end of which includes several branches 21, 22, 23 which are connected to said switching means AI, AII, AK, respectively.

These switching means AI, AII, . . . , AK enable the peripheral computers CPI, CPII, . . . , CPK to be linked directly with the memories MI2, MII2, . . . , MK2 of said various groups MI, MII, . . . , MK of memories which are associated with the current phase of flight.

The phase detector P is, moreover, connected to the main computer CAL by way of a link 3. Said main computer CAL transmits the effective values detected by the sensors C1, C2, . . . , Cm to the mathematical and/or logical models which are recorded in the peripheral computers CPI, CPII, . . . , CPK and which are associated with the current phase of flight. It then checks the consistency with the operating ranges and/or the laws contained in these models and it records any incompatibility, obviously taking account of the tolerances and limits of accuracy of the measurements.

The device according to the invention also includes a display device V, for example a luminous support, connected by way of a link S1 to the output S of the main computer CAL and enabling the crew to be notified, explicitly, of all the incompatibilities recorded by said main computer CAL. This notification will preferably be carried out according to phraseology familiar to the crew or according to obvious and unambiguous symbolism. In parallel, this display device may be supplemented with an audible or similar device, connected by way of a link S2 to the output S of the main computer CAL.

Thus, the crew will have continuous knowledge of the inconsistencies appearing in the operation of the airplane and will consequently be able to rectify an erroneous mental representation of the actual situation. The display device V can also be used to notify proposals for corrective actions.

For this purpose, the main computer is associated with a library B in which are recorded predefined messages which may be transmitted to the display device V for their notification. These messages may in particular indicate, if appropriate, the nature and/or the origin of a detected incompatibility, as well as possible corrective measures.

It will be noted that the function carried out by the switching means AI, AII, . . . , AK can, obviously, be carried out by computerization and that all the separate elements, namely the main computer CAL, the peripheral computers CPI, CPII, . . . , CPK, the groups MI, MII, . . . , MK of memories and the switching means AI, AII, . . . , AK may advantageously be integrated within a powerful means of computation in which computerization is the only "active agent". Computerization amounts, at this level, to a large-size arrangement of logic elements (gates, etc.). In order to elucidate this remark, all these elements have been grouped into a central unit UC.

We claim:

1. A process for detecting inconsistencies in the operation of a system with multiple phases of operation, controlled by at least one operator, each of said phases corresponding to a partial domain of the operation and the set of said phases covering the whole of said operation, wherein:

said system having a current phase of operation, which is determined;

for said determined phase, reference is made to at least one theoretical model representative of at least one feature of the system, said theoretical model having variables which have effective values;

the effective value of the variables used in said theoretical model is detected;

said detected effective values are compared to theoretical data defined in the theoretical model; and any incompatibility, which has characteristics, detected during these comparisons is signaled together with the characteristics of said incompatibility.

2. A device for the implementation of the process as claimed in claim 1, which includes:

a phase detector (P) for determining the current phase of an operation;

a set (E) of peripheral computers (CPI, CPII, CPK) for storing theoretical models representative of the system;

a set of sensors (C1, C2, Cm) for detecting the effective values of the variables involved in these models; and a main computer (CAL) furnished with a program for repetitive computation operating at a speed appropriate to the rate of change of the system and capable, depending on the current phase of operation notified by the phase detector (P), of searching for and picking out the inconsistencies in the operation of the system, by feeding into the models appropriate to said current phase the values detected by said sensors and by checking the consistency with theoretical data defined in these models.

3. The device as claimed in claim 2, said device further includes groups (MI, MII, MK) of memories storing general characteristics of the system and characteristics of the environment which are capable of being transmitted to said peripheral computers (CPI, CPII, CPK).

4. The device as claimed in claim 3, said device further includes switching means (AI, AII, AK) controlled by the phase detector (P) and enabling said peripheral computers (CPI, CPII, CPK) to be connected directly to the memories (MI2, MII2, MK2) of said groups (MI, MII, MK) of memories which are associated with the current phase of operation.

5. The device as claimed in claim 2, said device further includes a display device (V) notifying each incompatibility picked out by said main computer (CAL).

* * * * *